(12) United States Patent
Polo-Malouvier

(10) Patent No.: US 7,373,341 B2
(45) Date of Patent: May 13, 2008

(54) COMPUTER READABLE MEDIUM, METHOD AND APPARATUS FOR PRESERVING FILTERING CONDITIONS TO QUERY MULTILINGUAL DATA SOURCES AT VARIOUS LOCALES WHEN REGENERATING A REPORT

(75) Inventor: Ricardo Polo-Malouvier, Levallois-Perret (FR)

(73) Assignee: Business Objects, S.A., Levallois-Perret (FR)

( * ) Notice: Subject to any disclaimer, the term of this patent is extended or adjusted under 35 U.S.C. 154(b) by 0 days.

(21) Appl. No.: 11/271,702

(22) Filed: Nov. 9, 2005

(65) Prior Publication Data

US 2006/0149716 A1    Jul. 6, 2006

Related U.S. Application Data

(60) Provisional application No. 60/640,469, filed on Dec. 30, 2004.

(51) Int. Cl.
*G06F 17/30* (2006.01)
(52) U.S. Cl. .................... 707/3; 707/2; 707/6; 707/7; 707/102
(58) Field of Classification Search .............. 707/1–10, 707/100–104.1, 200–206; 704/4, 8
See application file for complete search history.

(56) References Cited

U.S. PATENT DOCUMENTS 5,787,410 A     7/1998  McMahon
5,966,685 A  * 10/1999  Flanagan et al. ............... 704/8
6,006,225 A  * 12/1999  Bowman et al. ................ 707/5
6,018,742 A     1/2000  Herbert, III
6,182,062 B1 * 1/2001  Fujisawa et al. ............... 707/3
6,275,819 B1 * 8/2001  Carter ........................... 707/2
7,113,960 B2 * 9/2006  Goldfuss et al. ......... 707/104.1

OTHER PUBLICATIONS

Lashmanan et al., Structural query optimization—A unirform framework for semantic query optimization in deductive databases, 1991, ACM, 102-114.*
Gene Fuh et al., Suppoting procedural constructs in existing SQL compilers, 1996, ACM, 1-13.*
International Search Report and Written Opinion mailed Oct. 1, 2007 for International Application No. PCT/US05/43563, 10 pages.

* cited by examiner

*Primary Examiner*—Jean B Fleurantin
(74) *Attorney, Agent, or Firm*—Cooley Godward Kronish LLP

(57) ABSTRACT

A computer readable medium, system, apparatus and method are disclosed for generating and regenerating query results in reports whereby conditions for filtering a query against multilingual databases are preserved independent of language and/or locale. According to one embodiment of the present invention, a computer readable medium includes executable instructions to specify a language-dependent value for filtering query results during a query. Other executable instructions are included to associate a first locale to the language-dependent value, determine a key based on the language-dependent value and on the first locale, and generate a transformed query, which can include a locale variable configured to indicate a second locale for regenerating the query results to form regenerated query results for the second locale using another language-dependent value.

10 Claims, 8 Drawing Sheets

FIG. 1A
(Prior Art)

| PROD_ID | LANG | PROD_NAME |
|---|---|---|
| P0010 | US | CAR |
| P0010 | FR | VOITURE |
| P0010 | DE | WAGEN |
| P0020 | US | PLANE |
| P0020 | FR | AVION |
| P0020 | DE | FLUGZEUG |
| ... | ... | ... |

FIG. 1B
(Prior Art)

| PROD_ID | US | FR | DE |
|---|---|---|---|
| P0010 | CAR | VOITURE | WAGEN |
| P0020 | PLANE | AVION | FLUGZEUG |
| ... | ... | ... | ... |

| PROD_ID | PROD_NAME |
|---|---|
| P0010 | CAR |
| P0020 | PLANE |
| ... | ... |

140b — FR

| PROD_ID | PROD_NAME |
|---|---|
| P0010 | VOITURE |
| P0020 | AVION |
| ... | ... |

| PROD_ID | VALUE |
|---|---|
| P0010 | PRICE |

170

| PROD_ID | LANG | PROD_NAME |
|---|---|---|
| P0010 | US | CAR |
| P0010 | FR | VOITURE |

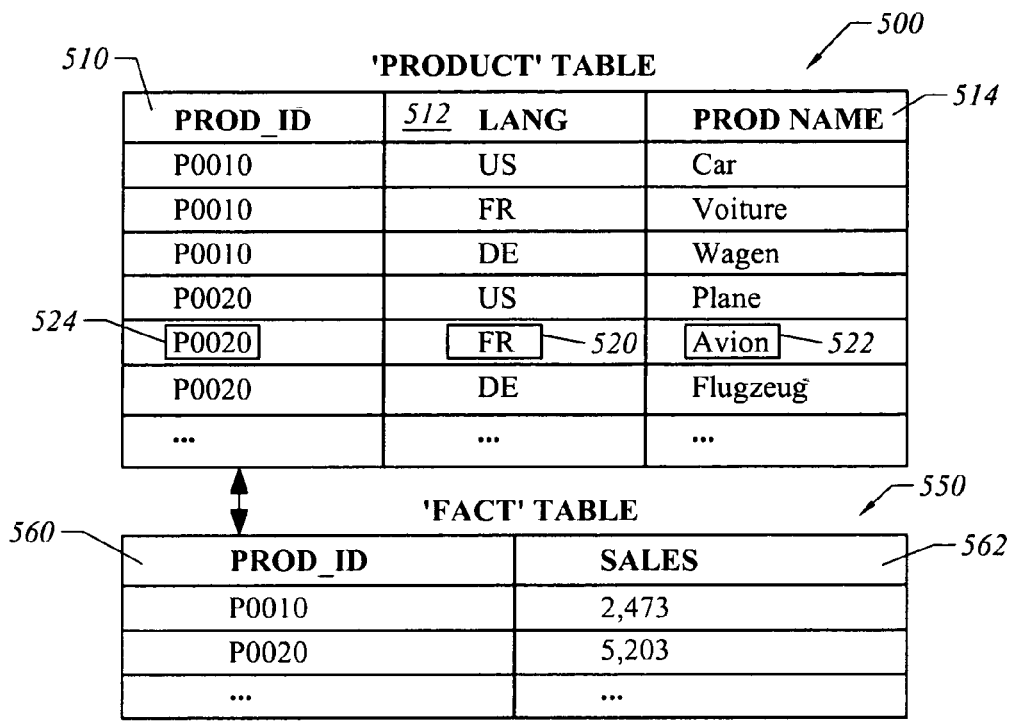

```
                                                    ╔═ 900        ╔═ 600
┌─────────────────────────────────────────────────────────────────┐
│ SELECT    PRODUCT.PROD_ID, PRODUCT.PROD_NAME, SUM(FACT.SALES)   │
│ FROM      PRODUCT, FACT          ╔═ 902                         │
│ WHERE     ┌──────────────────────────────────┐                  │
│           │ PRODUCT.PROD_ID = 'P0020'  C(t)  │                  │
│           │ AND                              │                  │
│           │ PRODUCT.LANG= @Language()        │                  │
│           └──────────────────────────────────┘                  │
│           AND                                                   │
│           PRODUCT.PROD_ID=FACT.PROD_ID                          │
│ GROUPBY   PRODUCT.PROD_ID                              q(t)     │
└─────────────────────────────────────────────────────────────────┘
```

*FIG. 9*

```
                                                         ╔═ 1000
┌─────────────────────────────────────────────────────────────────┐
│ SELECT    PRODUCT.PROD ID, PRODUCT.PROD_NAME, SUM(FACT.SALES)   │
│ FROM      PRODUCT, FACT                                         │
│ WHERE     ┌──────────────────────────────┐                      │
│           │ PRODUCT.PROD ID = '[P0020]'  │─ 1002                │
│           │ AND                          │                      │
│           │ PRODUCT.LANG = '[FR]'        │                      │
│           └──────────────────────────────┘                      │
│           AND                    ╚═ 1010                        │
│           PRODUCT.PROD ID = FACT.PROD ID                        │
│ GROUPBY   PRODUCT.PROD_ID                          q(t@FR)      │
└─────────────────────────────────────────────────────────────────┘
```

╔═ 1040

| Product Name | Revenue |
|--------------|---------|
| [Avion] ─ 1050 | 5,203 |

*FIG. 10*

```
                                                         ╔═ 1100
┌─────────────────────────────────────────────────────────────────┐
│ SELECT    PRODUCT.PROD_ID, PRODUCT.PROD NAME, SUM(FACT.SALES)   │
│ FROM      PRODUCT, FACT                                         │
│ WHERE     ┌──────────────────────────────┐                      │
│           │ PRODUCT.PROD ID = '[P0020]'  │─ 1102                │
│           │ AND          ╔═ 1110         │                      │
│           │ PRODUCT.LANG= '[US]'         │                      │
│           └──────────────────────────────┘                      │
│           AND                                                   │
│           PRODUCT.PROD_ID=FACT.PROD_ID                          │
│ GROUPBY   PRODUCT.PROD ID                          q(t@US)      │
└─────────────────────────────────────────────────────────────────┘
```

╔═ 1140

| Product Name | Revenue |
|--------------|---------|
| [Plane] ─ 1150 | 5,203 |

*FIG. 11*

COMPUTER READABLE MEDIUM, METHOD AND APPARATUS FOR PRESERVING FILTERING CONDITIONS TO QUERY MULTILINGUAL DATA SOURCES AT VARIOUS LOCALES WHEN REGENERATING A REPORT

CROSS REFERENCE TO RELATED APPLICATIONS

This application claims the benefit of U.S. Provisional Application No. 60/640,469, entitled "Computer Readable Medium, Method And Apparatus For Preserving Filtering Conditions To Query Multilingual Data Sources At Various Locales When Regenerating A Report," filed on Dec. 30, 2004, the contents of which are hereby incorporated by reference in their entirety.

BRIEF DESCRIPTION OF THE INVENTION

This invention relates generally to the generation of reports in a computer network. More particularly, this invention relates to a technique for preserving conditions (e.g., semantics) of a query to filter multilingual databases based on a language and/or locale specific to regeneration of query results, or reports.

BACKGROUND OF THE INVENTION

Multilingual data sources, such as multilingual databases, generally store translated label values representing words in different languages, such as English, German or French. Multilingual data schemas have been developed to store, relate and access those translated label values depending on the language of interest. A "translated label value," or "TLV," refers generally to the data representing a specific translated word from one of many languages, whereby a common meaning usually relates a collection of translated label values over a number of different languages. Examples of common multilingual data structures are depicted in FIGS. 1A to 1D.

FIG. 1A shows a portion of common data structure 100 for relating multilingual data for generating reports. Data structure 100 contains "duplicate rows" where each of the duplicated rows relates a specific translated label to a specific concept, such as a product identifier ("ID"). Column 102 includes a common characteristic, such a product ID, column 104 indicates a language to which a translated label belongs, and column 106 contains the translated labels (or words), such as "car," "voiture," and "wagen," all of which relate to a common meaning. As such, these translated labels of duplicate rows relate to a group of common product IDs, such as groups 108 and 110. To find a specific label for a query, specific values in both columns 102 and 104 are required to determine a product name ("Prod_Name"). FIG. 1B shows a portion of another common data structure 120 for relating multilingual data in a manner similar to that of FIG. 1A. Data structure 120, however, contains "duplicate columns" where each of the duplicated columns relates a specific translated label to a product ID as a specific concept. Specifically, column 122 includes product IDs as a common characteristic, and duplicated columns 124 indicate product names having translated labels expressed in different languages. As shown, columns 124a, 124b, and 124c include translated labels in English, French, and German, respectively, and rows 228 and 230 identify specific product IDs, such as P0010 and P0020, respectively.

FIG. 1C depicts a portion of another traditional multilingual data structure that includes at least two separate data structures 140a and 140b, each of which contains labels of one specific language. In this case, table 140a is described as an English table 146a for words used in, for example, the United States ("US"), whereas table 140b is a French table 146b for words used in, for example, France. Columns 142a and 142b include product IDs and columns 144a and 144b includes respective translated labels, but in different languages. FIG. 1D illustrates a portion of yet another conventional multilingual data structure where a sub-table 170 of translated values is dynamically produced from a base table 160 to improve performance of data access as compared to the data structures shown in FIGS. 1A to 1C. In particular, base table 160 includes product IDs and a specific untranslated value, such as a "price," in columns 162 and 164, respectively. Given product ID P0010, sub-table 170 is generated to include columns 172, 174 and 176 to relate product IDs, language, and product names, respectively.

While the foregoing data structures and associated multilingual data schemas are functional, there is a common drawback in the implementation of these data structures when reports are generated in different locales, especially where the languages at those locales are also different. Labels, such as product names, are traditionally hard-coded into a query for matching translated labels in a multilingual data source against which a user input queries. For instance, consider that one desires to determine the sales revenue for a given product, such as a product having an English name of "plane." To perform a query on the sales revenue for a product named plane, one traditionally has to design a filtered query so that only rows matching this product are retrieved from the data source (when implementing a "duplicate rows" schema). When building a filtered query, a user typically uses the product names that are in their own language, rather than either in a foreign language or as represented by some untranslatable attribute, such as a product identifier, that is not readily discernable to a user. Generally, untranslatable attributes are identifiers that are internal to a database and are usually understood only by those skilled in manipulating specialized database programming languages. To build a conventional filtered query for the English-named product plane, a skilled user typically develops a code snippet equivalent to WHERE PRODUCT.PROD_NAME="plane" to query a multilingual database. The drawback to this approach is that in another locale (or language), the translated label in one language cannot match the user input in another language, and as such, a regenerated report at another locale can lead to improper query results. For example, if a query is coded to only search for French labels of table 100, as defined by a specific language field, LANG "FR," then English words, such as "plane," cannot be used to filter the query when it is rerun, unless the software processes conducting such a query are modified for use with the English language. As such modifications are typically manual in nature, there are additional costs and/or efforts required to implement the data structures of FIGS. 1A to 1D in multilingual database operations, such as in report generation.

In view of the foregoing, it would be highly desirable to provide an improved technique for generating reports from data maintained in multilingual data sources. In particular, it would be highly desirable to generate reports in a language at a locale different from that where the original query was formed, without manually modifying queries and/or software programs to do so.

SUMMARY OF THE INVENTION

A computer readable medium, system, apparatus and method are disclosed for generating and regenerating query results in reports whereby conditions for filtering queries against multilingual databases are preserved independent of language and/or locale. According to one embodiment of the present invention, a computer readable medium includes executable instructions to regenerate results of a query in a language other than one used to initially generate the results of the query. The computer readable medium includes executable instructions to specify a language-dependent value of a plurality of language-dependent values for filtering query results in accordance with the one language-dependent value. Other executable instructions are included to associate a first locale to the language-dependent value, determine an language-independent key based on the language-dependent value and on the first locale, and generate a transformed query with a locale variable that is configured to indicate a second locale for regenerating the query results at or for the second locale. For example, the query results can be in a first language and the regenerated query results can be in a second language. The language-dependent value and another language-dependent value can each be a string.

According to another embodiment of the present invention, a computer readable medium includes executable instructions to specify query parameters, which are configured to formulate a query. Also, the computer readable medium includes executable instructions to specify a condition identifying a first translated label value associated with a first language. Other executable instructions are included to transform the condition to form a translated condition as a function of a locale variable, and implement the translated condition with the query to form a transformed query that is language-independent prior to generating a report. The transformed query is configured to automatically regenerate the results of the query as part of the report in a second language.

According to yet another embodiment of the present invention, an apparatus is disclosed for preserving filtering conditions to regenerate query results using multilingual data sources for various locales. The apparatus includes a locale manager configured to provide at least a locale indicator identifying a first language and a multilingual query engine. The multilingual query engine is configured to access data sources each maintaining data in multiple languages. Notably, the multilingual query engine is configured further to accept query parameters of a query, to acquire a condition for filtering the query to provide query results in terms of the condition, and to transform the query into a transformed query. The transformed query is configured to provide the query results in any language as determined by one of a plurality of locale indicators. In a specific embodiment, the apparatus also includes a report engine configured to generate a report including the query results in a language specified by one of the plurality of locale indicators.

BRIEF DESCRIPTION OF THE FIGURES

The invention is more fully appreciated in connection with the following detailed description taken in conjunction with the accompanying drawings, in which:

FIGS. 1A to 1D illustrate portions of common data structures for conventionally storing and relating data expressed in multiple languages;

FIGS. 5-11 show examples of the formation of transformed queries using the apparatus of FIG. 4;

Like reference numerals refer to corresponding parts throughout the several views of the drawings.

DETAILED DESCRIPTION OF EXEMPLARY EMBODIMENTS

Figure 2:
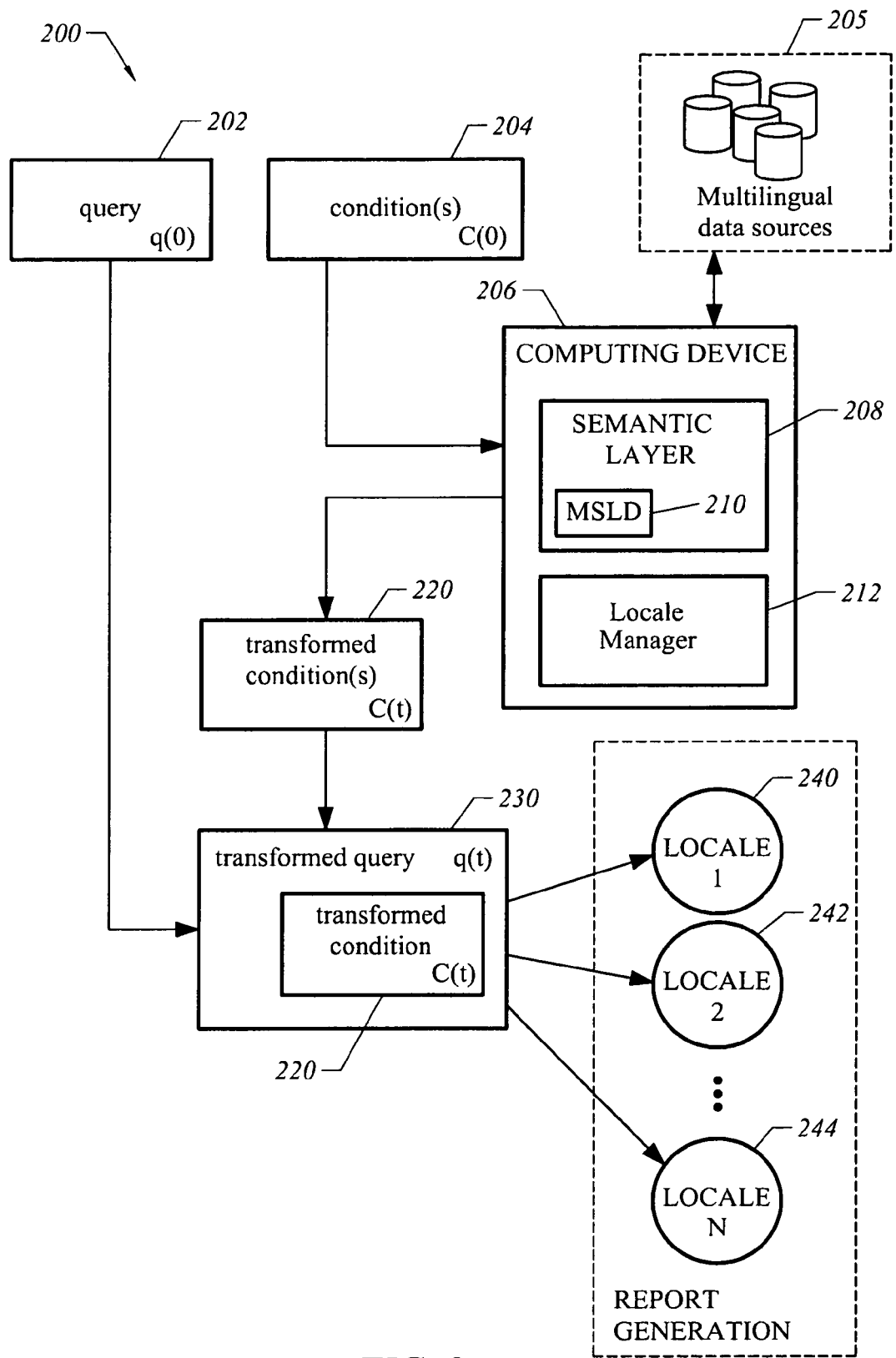
FIG. 2 is a functional block diagram illustrating the formation of a transformed query that preserves conditions as a transformed condition independent of language and/or locale, according to at least one embodiment of the present invention.

FIG. 2 is a functional block diagram 200 illustrating the formation of a transformed query that preserves conditions as transformed conditions, which are independent of language and/or locale, according to at least one embodiment of the present invention. In particular, FIG. 2 depicts a query ("q(0)") 202 being transformed into a transformed query ("q(t)") 230, which is a set of executable instructions defining the information to be used for generating a report in differing languages for different locales. Examples of different locales having different languages are represented as locale ("1") 240, locale ("2") 242, and locale ("N") 244. Note that transformed query 230 is generated, in this example, for a locale specific to computing device 206. Transformed query ("q(t)") 230 includes at least one transformed condition ("c(t)") 220 for preserving an initial condition in a form that is independent of language. Advantageously, the preservation of conditions in accordance with the present invention facilitates filtering of multilingual data sources for report generation at or for any locale, regardless of language and without manual intervention (e.g., without modify executable instructions to produce a report in another language). By contrast, traditional techniques of filtering multilingual data sources rely on matching word strings input from a user, for example, against a number of fields having various string values, which are typically limited to a specific language. Consequently, if the query is to be conventionally regenerated in another language, then a user is required to manually intervene to, for example, change the selection from one set of fields having various string values in one language to another set of fields specific to another language. This requires specialized knowledge and generally leads to inefficiencies in generating reports in various languages.

As used herein, the term "query" is used in some embodiments to describe a collection of specifications (or question parameters) used to search for and to extract a set of data requested from a database, such as a multilingual database. Note that the query may be created in a variety of ways, such as being provided manually, through the use of a graphic user interface ("GUI"). Or, it can be programmatically provided based on predetermined conditions. The term "report" generally refers to structured information constituting the results of a query, including titles, page formatting, and the like, in a language specified by preserved conditions, such as preserved semantics. As used herein, the term "condition" is used in some embodiments to describe, in whole or in part, a user input for filtering the results of a query according to certain criteria specified by the user. A condition typically is a string of characters representing a word in a particular language, and in some cases, includes a comparator operator, such as comparative operators "equal to," "greater than," "less than," or the like.

Transformed condition 220 is a language-independent condition that is used to filter or further refine the results of a query, as specified by condition ("c(o)") 204, but generally in a different language than that initially used to specify condition 204. So by transforming language-dependent condition 204 into a language-independent condition for a first locale, a user associated with a second locale can use transformed condition 220 to run query 202 as transformed query 230, thereby producing a report with similar query results to that expected with condition 204, but in a different form (e.g., in a different language). The preserved condition of transformed condition 220 is used to determine the specific language.

A computing device 206 generates transformed condition 220 from one or more conditions 204, and does so based on, for example, locality, one or more equivalent translated labels that are each translated into different languages, language-independent keys, and associations among locality, translated labels and keys. In particular, computing device 206 includes a semantic layer 208 that includes at least business-oriented associations for mapping multilingual queries to data in underlying multilingual databases 205. Included in semantic layer 208, among other things, are multilingual semantic layer objects ("MSLO") 210 each of which at least functions to relate a key to either a locality or a number of translated labels, or both. Computing device 206 also includes locale manager 212 for maintaining and providing information that identifies the locality to specify the language to be used for the query. In general operation, computing device 206 selects an MSLO 210 associated with condition 204 to retrieve a language-independent key from multilingual databases 205. Then, computing device 206 forms transformed condition 220 to include, for example, the retrieved key and a locale variable, which is configured to take on a value provided by a particular locale manager. An exemplary method of forming transformed query 220 is illustrated in FIG. 3.

A suitable semantic layer 208 for practicing a specific embodiment of the present invention can be implemented using a Business Objects Designer module, which is manufactured by Business Objects SA. As used herein, the term "label" is used in some embodiments to describe a string of one or more characters, such as those characters constituting a description of translated words (e.g., the term "product name" is such a description), and the term "translated label" is used to describe a string representing a translation of a word in one of many languages. Examples of translated labels are "Plane," which is a translated word in English, and "Avion," which is a translated word in French, with both translated labels being associated with the label "product name." As used herein, the term "locale" is used in some embodiments to describe a collection of settings related to, for example, a regional or cultural preference for a particular locale. A locale can define, among other things, a computer environment that determines the date/time display format, default currency units, default measurement system, and user interface language and the language of the contents of generated reports.

Figure 3:
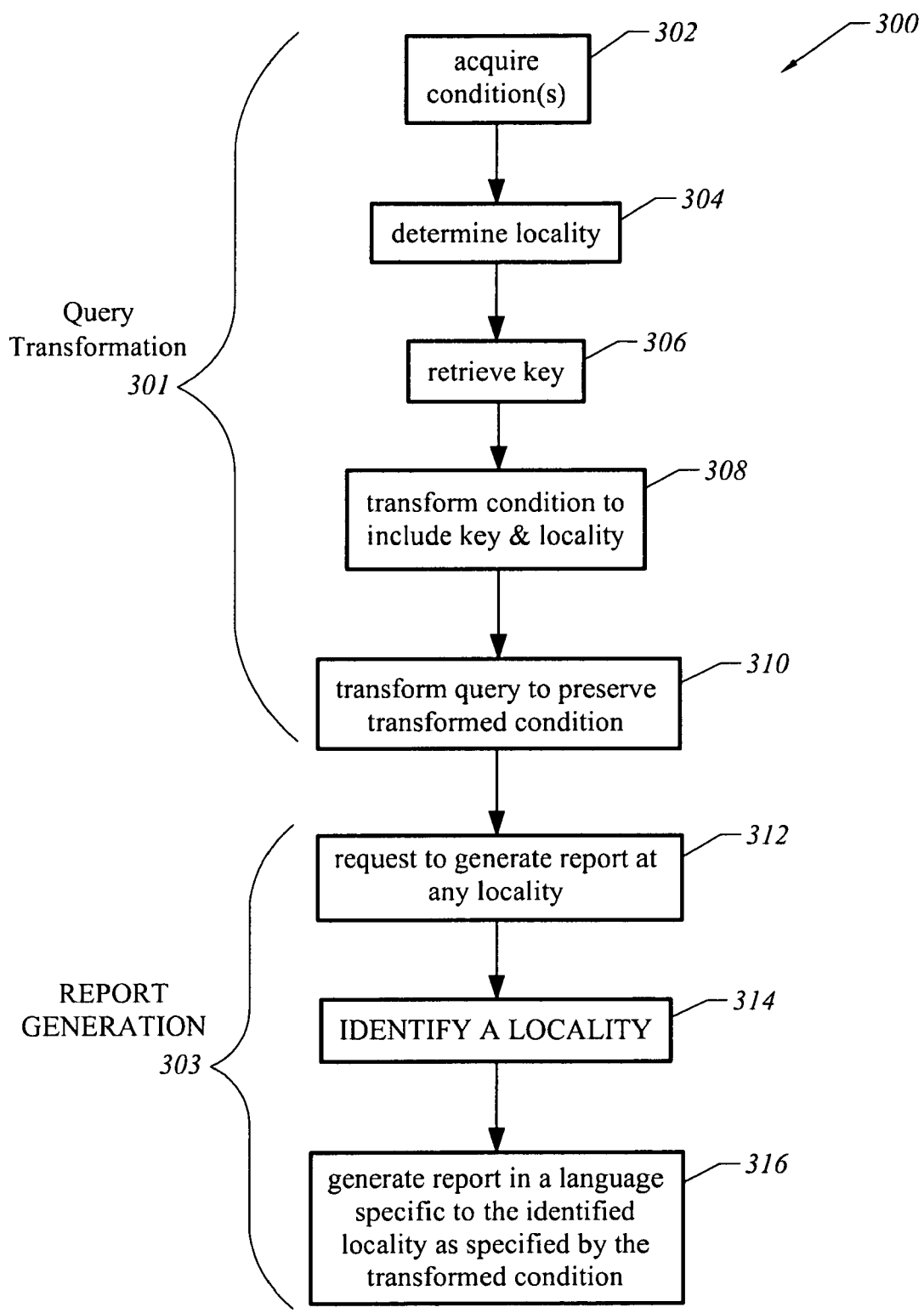
FIG. 3 is a flow diagram exemplifying a method of generating a report using a transformed query, according to an embodiment of the present invention.

FIG. 3 is a flow diagram exemplifying a method of generating a report using a transformed query, according to an embodiment of the present invention. During the query transformation process 301, a user, for example, specifies one or more translated labels as conditions at 302. The locality, once determined at 304, then predetermines a unique key used to identify the condition, the key being independent of language. An association between the translated label, the locality, and the key, such as that set forth by a multilingual semantic layer object, is used to locate the key. In particular, when two of the three are known (e.g., locality and translated label), then the third (e.g., the key) can be made known. At 306, the unique key is retrieved. The condition is the then modified into a transformed condition at 308, which includes the retrieved key and a locale variable. Next, a query can be modified at 310 to form a transformed query, which is a language-independent query irrespective of the language used to define the conditions. The transformed query then can be stored for later execution. Or, a user can execute the transformed query during report generating process 303, with the locale variable being satisfied at run-time (i.e., during report generation process 303).

Consider that a request to generate a report for any locality (or locale) is made at 312 to initiate report generation process 303. If the locality at which the request is being made is the same as the condition set forth at 302, then the query results generated will be in the same language, unless otherwise specified. But if the locality at which the request is being made is different than the locality at which the condition was acquired at 302, then the language of the regenerated report, in whole or in part, will be different than the language used to define the condition. At 314, the specific locality is identified. At 316 a report is generated in a language specific to the locality identified at 314, the locality being included in the transformed condition at run-time.

Figure 4:
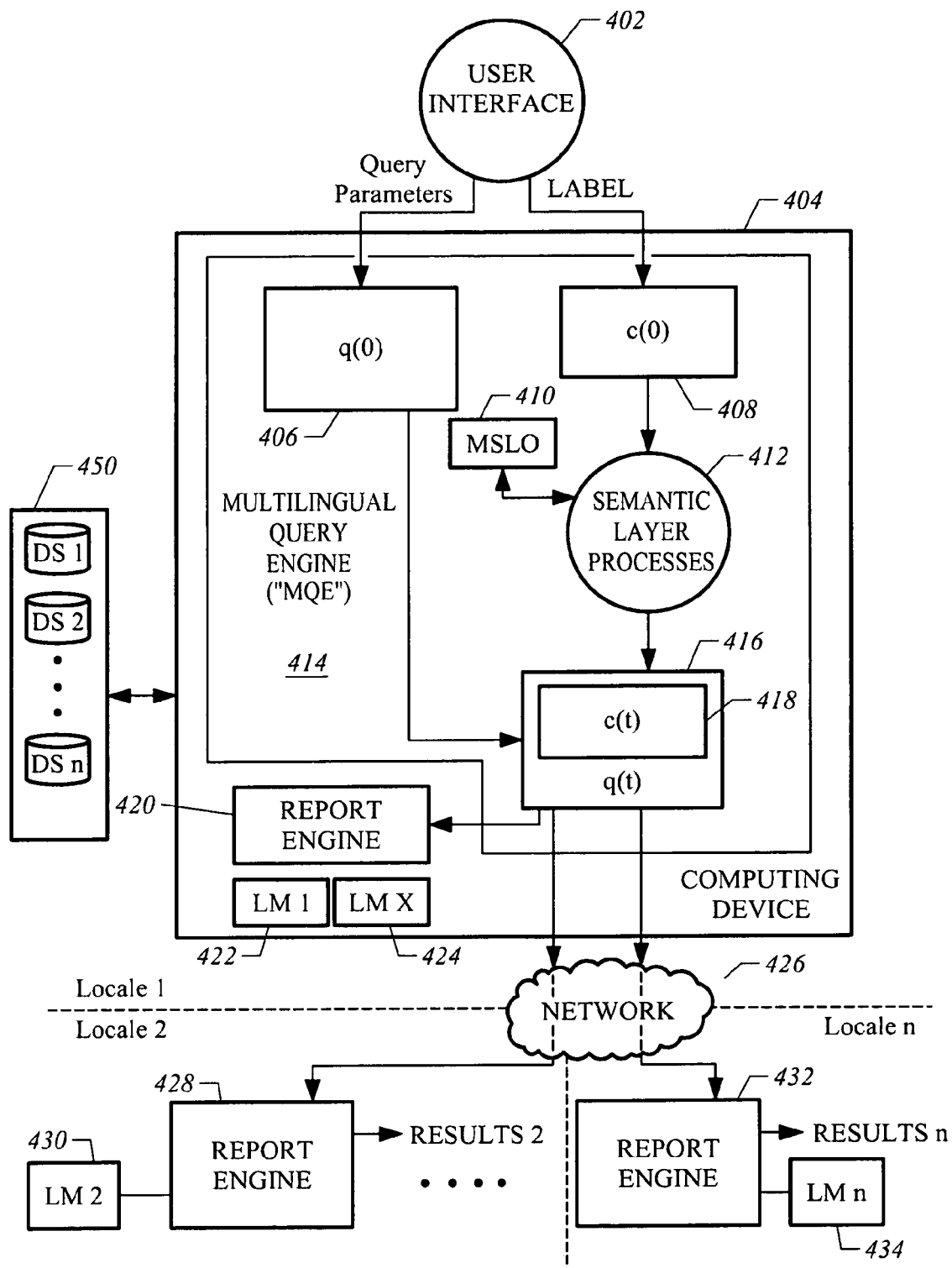
FIG. 4 is a diagram of an apparatus configured to regenerate query results from transformed queries at or for one or more report engines, according to an embodiment of the invention.

FIG. 4 is a diagram of an apparatus configured to regenerate query results from transformed queries at one or more report engines, according to an embodiment of the invention. Apparatus 404 includes a multilingual query engine ("MQE") 414 and a report engine 420, both of which can be implemented in either hardware or software, or in a combination of both. Multilingual query engine 414 implements the associations of multilingual objects to transform queries from one language to another, and report engines 420, 428, and 432 generate reports based on the transformed queries. Multilingual query engine 414 is configured to accept an initial query ("q(o)") 406 and one or more conditions ("c(o)") 408 via user interface 402, for example, to form a transformed query ("q(t)") 416. One or more multilingual data sources 450, such as data source one, or "DS1," "DS2" or "DSn," provide multilingual data from which the query results will be derived. Multilingual query engine 414 accepts the condition in the form of a standard query language, such as SQL. A generalized condition suitable for forming a transformed condition in SQL is:

DATA_SOURCE.MSLO_NAME="*TLV*,"

where DATA_SOURCE refers to a multilingual data structure, such as a table, containing the multilingual data of interest and MSLO_NAME refers to the name of the multilingual semantic layer object that is "equal to" the translated label value (i.e., data representing the translated label) submitted by the one performing the query. As an example, consider that query parameters of an initial query include "product names," "revenue" and an indication that a correlation between those two, such as revenue per product, is to be queried. DATA_SOURCE in this example can refer to a table identified as "PRODUCT," which is the data structure containing the product names sought for the query. Further, consider that condition ("c(0)") 408 is specified as an instance of a product name, such as the French product name "Avion," that will be used to filter against multilingual data sources 450.

Semantic layer process module 412 of multilingual query engine 414 is configured to interact with semantic layer 208 (FIG. 2) and to use associations of multilingual semantic layer objects, such as MSLO 210, to transform condition 408 into a transformed condition ("c(t)") 418 for automatically running a report and/or generate query results in a language suitable for a given locale. An initial step in forming transformed condition 418 is to use the associations of MSLO 410 to determine a language-independent key. In particular, semantic layer process module 412 translates a language-dependent translated label value (e.g., "Avion") into a language-independent key (e.g., "P0010"), with the locale providing for such translation. For example, a locale indicator "FR" can specify that the particular locale is France.

To determine a key according to a specific embodiment, semantic layer process module 412 employs a generalized SQL statement, such as the following, to transform condition 408 to form a transformed condition 418:

| | |
|---|---|
| SELECT | DATA_SOURCE.KEY |
| FROM | DATA_SOURCE |
| WHERE | DATA_SOURCE.MSLO_NAME = 'TLV' |
| | and |
| | DATA_SOURCE.LANG = 'XX' | where LANG refers to a field in the DATA_SOURCE that will be filtered against the translated label value ("TLV") to match one of the stored translated label values in the data source or table. "XX" represents a locale indicator specifying the language that will be used to create a report. The locale indicator, XX, can be provided by a locale manager, such as locale manager one ("LM1") 422. Upon matching the input translated label with a translated label value for a specific locale, the associated key can thus be identified.

Once the semantic layer process module 412 determines the key, then that language-independent key is retrieved and used to form transformed condition 418, which can be expressed in terms of the key and a locale variable. A locale variable is configured to take a value (e.g., locale indicator) at runtime that is indicative of a locale (and/or language) for which a report is generated. To form transformed condition 418 according to a specific embodiment, multilingual query engine 414 defines transformed condition 418 as a generalized SQL statement, such as in the following:

DATA_SOURCE.KEY='#####' and
DATA_SOURCE.LANG=@Language( )

where KEY refers to the key identifier '#####' that is language-independent, and @Language( ) refers to the name of locale variable configured to take the value of a locale indicator for specifying the language that will be used to create a report. So at run-time, the key and the locale (i.e., language) will be known. To produce a transformed query 416, initial query 406 is associated with (or includes) transformed condition 418, whereby transformed query 416 will provide query results in terms of the language used to either run the report or view the report, or both.

Next, any of report engines 420, 428 or 432 can evaluate transformed query 416 at or for respective locales 1, 2 or n. As an example, consider that report engine 420 is disposed in computing device 404, which resides in France. Further to this example, other report engines, such as report engines 428 and 432, are located in the United States and Germany, respectively. Report engines 428 and 432 receive queries (specifically transformed queries 416) via network 426 for execution. Each report engine includes a locale manager ("LM") for indicating the locale of interest, which in this example refers to a geographic locale. For instance, "LM1" 422 is configured to produce a locale indicator of "FR" for France, whereas "LM2" 430 and "LMn" 434 respectively produce locale indicators of "US" and "DE," for example. In a specific embodiment, report engine 420 includes locale manager ("LMx") 424 for enabling execution (e.g., report generation) at computing device 404 even if the query results are for consumption at another locale. While the preceding example describes the locales as geographic locales, the term "locale" is not restricted to connote just geographic locations and is intended to have a broader interpretation, as is indicated below with respect to FIG. 12.

To illustrate how an initial query can be established, consider that multilingual query engine 414 is implemented, in whole or in part, as a module manufactured by Business Objects SA. A user uses multilingual query engine 414 to build a query via a query panel, which is a portion of a user interface that provides business objects. The user then drags and drops objects from the query panel, such as a "Product name" object and a "Revenue" object, into a result pane, which is a functional portion of the user interface that defines the query parameters, thus indicating that the user wants to retrieve correlated values for these two objects (namely, revenue per product). Then, the user drops the "Product Name" object, which in this example is a multilingual semantic layer object, into a filter zone (or condition pane). The filter zone is another functional portion of the user interface defining the conditions of the query. In this case, the conditions indicate that the user wants to select only a certain product name, such as "Avion." At this stage, computing device 404 proposes several comparative operators, such as "equal to _____," "in list_____", "not equal to _____," etc. Consider that the user picks the "equal to" condition and enters a constant, such as the word "Avion." Accordingly, multilingual query engine 414 will query multilingual data sources containing data relating to product names and revenues to generate results for "Avion." FIGS. 5-11 extend the present example to further illustrate the functionalities of multilingual query engine 414, according to at least a specific embodiment of the present invention.

Further to the foregoing example, consider that FIG. 5 depicts an exemplary multilingual data source 500, according to a specific embodiment of the present invention. In this example, multilingual data source 500 is a table storing multilingual data in accordance with a "duplicative row" schema for relating product identifiers, languages and product names. In particular, column 510 stores product identifiers ("PROD_ID") as keys, column 512 stores language indicators ("LANG") identifying the language to which a product name belongs, and column 514 stores product names ("PROD NAME") as translated labels. FIG. 5 also depicts that multilingual data source 500 is linked to a fact table 550 for storing descriptive information regarding the products of multilingual data source 500. In particular, fact table 550 stores sales facts for the various products, whereby column 560 stores product identifiers and column 562 stores associated sales figures.

As stated earlier, the user in this example is interested in filtering a query using product name "Avion." As shown in FIG. 6, query ("q(o)") 600 includes generalized structured query language instructions that are configured to cause a multilingual query engine to generate a total sum of a sales, or revenue, for various product names. Query 600 includes a condition 602 for filtering the results of query 600 to yield total sales or revenue for the product named "Avion." Advantageously, condition 602 is easily understood by users forming query 600, such as represented by business objects, and as such, it is evident how query 600 is being filtered. For example, the condition, "Avion," is easily understood by French-speaking users, who should readily identify that query 600 is to be filtered against the term "Avion."

FIG. 7 depicts generalized structured query language instructions for identifying a key to be used to form a transformed condition. Code snippet 700 is configured to select a product identifier, or key, based on a translated label ("Avion") 702 and a locality associated with a locale indicator ("FR") 704. Upon executing code snippet 700, multilingual query engine will retrieve "P0020" as a key. As shown in FIG. 5, translated label 702 matches at field 522 and locale indicator 704 matches at field 520, thereby identifying field 524 as including key "P0020."

FIG. 8 depicts a representation of a transformed condition as formed by a multilingual query engine. As shown, transformed condition 800 includes a key ("P0020") 802 and a locale variable ("@Language( )") 804. FIG. 9 illustrates formation of a transformed query ("q(t)") 900, according to a specific embodiment of the present invention. In this example, transformed query 900 includes query 600 and transformed condition 902 and represents the semantics of what a user has specified, regardless of their language or locale. In most embodiments, transformed query 900 and/or transformed condition 902 are preserved as part of the query results. So when a French user runs the report, the locale variable will be resolved into the current user's language, such as the locale indicator "FR."

If a request to run the report is at a French locale, FIG. 10 represents a representative code snippet 1000 as a transformed query for execution for a particular locale. As shown, code snippet 1000 includes transformed condition 1002, with its locale indicator value 1010 being resolved as "FR." As such, FR is used to query a multilingual data source for generating reports in the French language. Also, FIG. 10 includes query results derived from executing transformed query 1000, with the query results being depicted as regenerated report 1040. Note that the original condition that had been input by the user is shown as translated label "Avion" in field 1050. But if the request to run the report is at a locale in the United States, FIG. 11 represents another code snippet 1100 representing the transformed query for execution at a different locale. As such, code snippet 1100 includes transformed condition 1102 with a locale indicator value ("US") 1110 that has been resolved for generating reports in the English language (and in particular, the English language of the United States). Query results from executing transformed query 1100 are depicted as regenerated report 1140, where the original condition, "Avion," is shown as translated label "Plane" in field 1150 to accommodate English-speaking users in the U.S.

Note that the examples of FIGS. 5-11 implement a specific type of database schema known as duplicate rows. But various embodiments of the present invention can implement other database schemas, such as "duplicate columns" and "separate translation tables" schemas. First consider that multilingual data source 500 (FIG. 5) includes duplicate columns for product names in different languages, each column being reserved for one language or locale. For instance, one column is reserved for English product names with a title of "Product.EN_NAME," whereas another column is reserved for French product names with a title of "Product.FR_NAME." In this case, associating a unique identifying key value to a translated label and locale indicator can be determined by using the following: WHERE=PRODUCT.@Language( )_NAME, where @Language( ) is a locale variable configured to take a value representing a locale at run-time. Given a condition for filtering multilingual data sources, such as "equal to Avion," the translated label Avion will be matched against fields of a column determined by @Language( ). So if users in the locale are French-speaking, @Language( ) will be resolved to be FR and the column Product.FR_NAME will be queried. Upon finding a match, a unique key can be determined. Thereafter a transformed condition can be formed in a similar fashion described above.

To determine a key using a duplicate columns schema in accordance with a specific embodiment, semantic layer process module 412 (FIG. 4) employs a generalized SQL statement, such as the following, to transform condition 408 to form a transformed condition 418:

| | |
|---|---|
| SELECT | DATA_SOURCE.KEY |
| FROM | DATA_SOURCE |
| WHERE | DATA_SOURCE.@COLUMN(XX,MLSO_NAME) = 'TLV' | where @COLUMN refers to a column that includes a field that matches TLV to the MLSO_NAME in the DATA_SOURCE, and "XX" represents a locale indicator specifying the language that will be used to create a report. Note that in this instance, "@COLUMN" represents a set of executable instructions (e.g., a macro) that identifies which one of a number of duplicate columns is used for locating and retrieving the key.

Next, consider that that multilingual data source 500 includes separate translation tables, each table being reserved for one language or locale. For instance, one table is reserved for English product names with a title of "PRODUCT_EN_US" (and contains product IDs as keys and English product names), and another table is reserved for French product names with a title of "PRODUCT_FR_FR" (and contains product IDs as keys and French product names). In this case, associating a unique identifying key value to a translated label and locale indicator can be determined by using the following: WHERE=PRODUCT_@(Language( ).NAME, where @Language( ) is a locale variable configured to take a value representing a locale at run-time. Given a user input of "Avion," the translated label Avion will be matched against fields in a table determined by @Language( ). If users in the locale are French-speaking, the PRODUCT_FR_FR table will be selected for retrieving a key using French product names. Upon finding a match, a unique key can be determined. Thereafter a transformed condition can be formed.

To determine a key using a separate translation tables schema in accordance with a specific embodiment, a semantic layer process module employs a generalized SQL statement, such as the following, to transform a condition to form a transformed condition:

```
SELECT    @TABLE(XX,MLSO_NAME).KEY
FROM      @TABLE(XX,MLSO_NAME)
WHERE     @TABLE(XX,MLSO_NAME).MLSO_NAME = 'TLV'
``` where @TABLE refers to a specific table (as a data source) containing a column identified by MLSO_NAME, and "XX" represents a locale indicator specifying the language that will be used to create a report. Note that in this instance, "@TABLE" represents a set of executable instructions (e.g., a macro) that identifies which one of a number of tables (or data sources) is used for identifying and retrieving the key.

Figure 12:
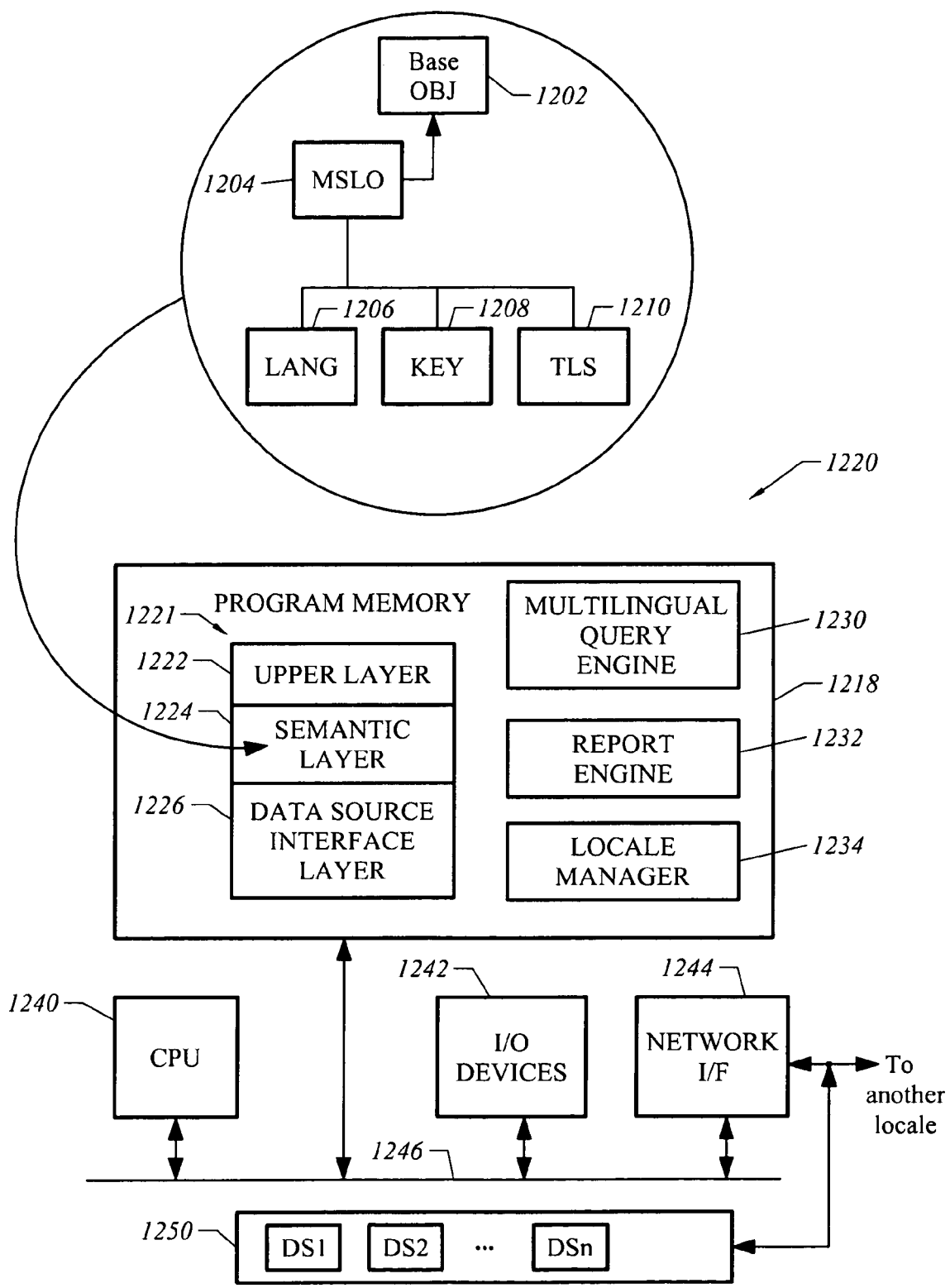
FIG. 12 introduces an architecture in which multilingual semantic layer objects ("MSLOs") are implemented to perform multilingual queries, according to at least one embodiment of the present invention.

FIG. 12 introduces an architecture in which multilingual semantic layer objects ("MSLOs") are implemented to perform multilingual queries, according to at least one embodiment of the present invention. In particular, FIG. 12 depicts an exemplary MSLO 1204 being associated to a base object 1202 as well as to its properties represented by, for example, a language field ("LANG") 1206, a key 1208 and one or more translated label ("TLs") 1210. These three properties of MSLO 1204 facilitate the regeneration of query results in any language regardless of the one used to initially generate the query, whereby the regenerated query results require no manual intervention to revise executable program instructions. Although these properties can be used for many purposes, their principal functions are briefly described as follows. LANG 1206 is a field describing a property configured to include a locale variable, the value of which depends on the locale where a report is run or is to be reviewed, thereby indicating the language to be used in regenerating reports. Key 1208 is a property that includes a unique, language-independent identifier for specifying a specific translated label value for a specific value of LANG 1206. In one embodiment, base object ("obj") 1202 provides key 1208 for relating one or more TLs 1210 having a synonymous meaning. TLs 1210 is a field describing a property configured to contain one of a number of translated label values, such as "Avion," when LANG 1206 indicates a locale indicator, "FR," to indicate a French-speaking locale.

Figure 13:
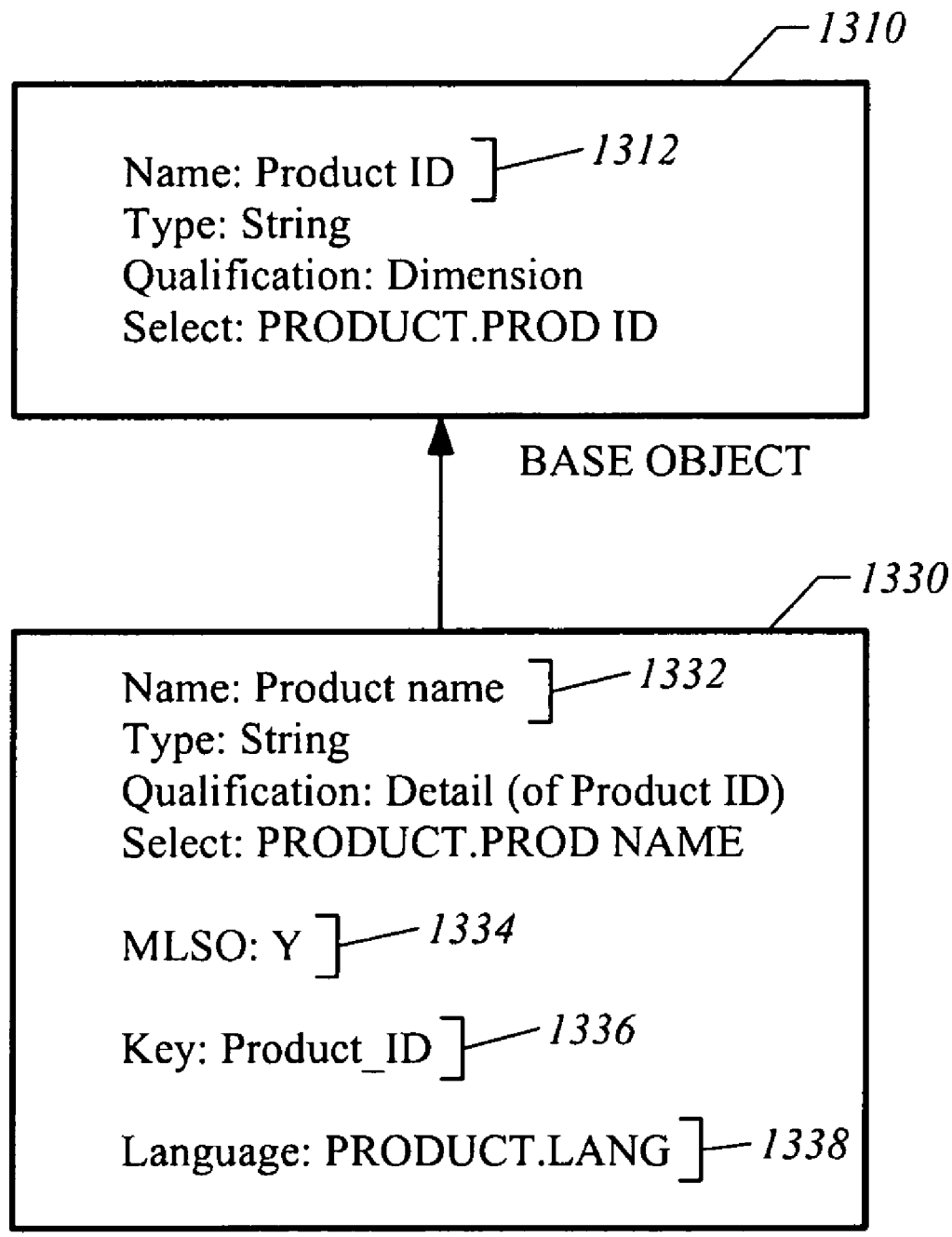
FIG. 13 shows examples of a base object and a multilingual semantic layer object of FIG. 12, according to one embodiment of the present invention.

FIG. 13 shows examples of a base object 1202 and an MSLO 1204, according to one embodiment. In FIG. 13, base object 1310 is associated with a name indicative of its function—it is associated with a product identifier, or "ID." Here, its name is maintained as property 1312. Similarly, MSLO 1330 is associated with a name for specifying a particular label and is described by property 1332. Here, the particular label to be translated into any one language represents a "product name." Further, MSLO 1330 includes a MSLO property 1334 indicating whether object 1330 is a multilingual object. In this example, MSLO 1330 includes an affirmative indication, "Y," as property 1334 to indicate that object 1330 is an MSLO. MSLO 1330 can also include a product ID (or a reference), such as P0020, as the unique language-independent key in property 1336. Further, MSLO 1330 includes a property 1338 for maintaining a locale variable for representing the language with which to query multilingual data sources.

Referring back to FIG. 12, both base object 1202 and MSLO 1204 are disposed within a semantic layer 1224 of a computing device 1220. Computing device 1220 includes a number of standard components, including a CPU 1240, input/output ("I/O") devices 1242, such as a graphical user interface, and a network interface ("I/F") 1244, all of which communicate via a bus 1246. Network I/F 1244 facilitates communications via any kind of network (not shown) to another computing device 1220 (not shown) for another locale, or to a number of various multilingual data sources 1250, each of which are represented as data source one ("DS1"), data source two ("DS2"), and data source "n" ("DSn").

Computing device 1220 also includes a memory 1218 that is also connected to bus 1246. Memory 1218 stores a set of executable programs that are used to implement the functions of the various embodiments of the present invention. In one embodiment of the invention, subsets of executable program instructions constitute a program engine 1221, a multilingual query engine ("MQE") 1230, a report engine 1232 and a locale manager 1234. Multilingual query engine 1230, report engine 1232 and locale manager 1234 have similar structures and/or functions as described above. Program engine 1221 includes various layers representing abstractions of program instructions, including upper layer 1222, semantic layer 1224 and data source interface layer 1226. Upper layer 1222 includes higher-level data representations and/or executable program instructions for effectuating multilingual querying, such as providing a graphical user interface (e.g., for accepting query data and for presenting report data) as well as application layer processing. Semantic layer 1224 includes intermediate-level data representations and/or executable program instructions for managing MSLOs 1204 and other business-related objects, according to one embodiment of the present invention. Objects such as MSLOs 1204 can be referred to as semantic layer objects as they are used to translate relatively sophisticated database code into business objects in terms that are easily understood by those having little or no experience in database programming. Data source interface layer 1226 includes lower-level data representations and/or executable program instructions for managing the exchange of data among computing device 1220 and multilingual data sources 1250.

As indicated above, the term locale is intended to have a broad meaning that describes more than a particular physical location or place. In various embodiments of the present invention, the term "locale" can also refer to a collection of settings defining a computer environment. A computer environment can be unique to a specific person (i.e., a unique user ID), a specific computing device, a specific applications program with which to generate a multilingual report, and the like. Consider that computing device 1220 is a server that is configured, for example, as computing device 206 (FIG. 2) for communicating with different locales, such as locale ("1") 240, locale ("2") 242, and locale ("N") 244 (all of FIG. 2). Each of locals 240-244 can represent a user and/or a computing device sharing a common network with computing device 1220. In the case that each locale is associated with a unique user, then when a user logs into a networked computing device (or is otherwise identified by computing device 1220), locale manager 1234 establishes a specific computer environment for that user, for example, by applying a collection of settings that determine a specific language for the user interface. Therefore, two or more users that are conversant in different languages can share a common user interface or computing device that uses report engine 1232 to generate language-specific reports based on a transformed query running. So when a user requests a report, locale manager 1234 uses a locale indicator, such as a user identifier ("ID"), to format the report in a language that is suitable for that user. For example, a locale indicator ("JOHNDOE123") can identify a user named John Doe and can associate that person to particular computing environment using a preferred language, such as English.

It should be appreciated that the executable modules illustrated in memory 1218 are exemplary. The functions of the invention may be implemented in any number of ways. In addition, it should be appreciated that functions of the invention need not be implemented on a single computing device 1220. The functions of the various embodiments of the present invention may be implemented across a set of servers, clients, clients and servers, etc. It is the functions of various embodiments that are significant, not where or how these functions are implemented.

In at least one embodiment of the present invention, a user can dynamically specify a translated label as a condition to filter multilingual databases rather than statically specifying that label. In particular, the following condition can be referred to as a static condition: PRODUCT.PROD_NAME="Avion." An example of procuring a condition dynamically can be expressed as:

> PRODUCT.PROD_NAME=@prompt("choose a product",PRODUCT_Name), where a user running the query will typically be presented with a dialog box called "choose a product." The user can then be presented with a list of possible values for the various product names in a multilingual database. When the user selects a particular product name to filter, the selected value then replaces the '@prompt' string in the query so that it if the user picks, for example, the product name "bicyclette" in the French language, then only query results for this product are reported. When the report is rerun at another locale having a different language, a list of values is presented to a user with those values being product names in a language determined by locale variable @Language( ). Given the selected product name, as a translated label, and specific locale indicator, a transformed condition can be determined in a manner similarly described above.

Although some of the foregoing examples describe using an initial query in one language for regenerating query results to form a report in another language, the various embodiments of the present invention are not limited to those examples. In at least one embodiment, a report being run at a particular locale might be composed of multiple subqueries, at least two of which have been formed in different languages, or at or for different locales. The two subqueries can be formulated in languages that are unlike that used to run the report. In alternative embodiments, "nested" subqueries can be used to form regenerated query results to create a report. For example, regenerate query results in one language, which are based on an initial query in another language, can be embedded in or form part of another query that yields regenerated results in yet another language. An ordinarily skilled artisan will appreciate that the embodiments of the present invention can be implemented in a variety of ways.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium including executable instructions to regenerate results of a query in a language other than one used to initially generate the results of the query, said computer readable storage medium comprising executable instructions to:
   specify a language-dependent value of a plurality of language-dependent values for filtering query results in accordance with said language-dependent value;
   associate a first locale to said language-dependent value;
   determine a key based on said language-dependent value and on said first locale, said key being common across tables storing information in different languages;
   generate a transformed query to include a locale variable configured to indicate a second locale for regenerating said query results to form regenerated query results for said second locale using another language-dependent value of said plurality of language-dependent values;
   detect said locale variable is set as said second locale; and
   supply a prompt to a user in a language associated with said second locale to provide a user input including said another language-dependent value, wherein said prompt facilitates receiving said another language-dependent value dynamically;
   wherein said transformed query is applied to said tables to form said regenerated results;
   wherein said query results are in a first language and said regenerated query results are in a second language, and said language-dependent value and said another language-dependent value are each a string.

2. The computer readable storage medium of claim 1 further comprising executable instructions to:

set said locale variable to represent said second locale; and form said regenerated query results for presentation for said second locale.

3. The computer readable storage medium of claim 2 wherein an object facilitates regenerating said query results by automatically forming said transformed query.

4. The computer readable storage medium of claim 2 wherein said executable instructions to determine said key comprise executable instructions to:

search a multilingual data source using said language-dependent value and a first locale indicator representing said first locale; and retrieve said key.

5. The computer readable storage medium of claim 4 wherein said executable instructions to form said regenerated query comprise executable instructions to search said multilingual data source using said key and a second locale indicator representing said second locale to retrieve said another language-dependent value.

6. The computer readable storage medium of claim 5 wherein said executable instructions to search said multilingual data source excludes executable instructions to match said language-dependent value against said data source.

7. The computer readable storage medium of claim 1 wherein said executable instructions to supply said prompt comprise executable instructions to retrieve a list of selections in said language from which said another language-dependent value is selected.

8. The computer readable storage medium of claim 1 wherein each of said first and said second locales is unique to a user and further comprising specifying a language in which to regenerate query results regardless of geographical location.

9. A computer system for preserving filtering conditions to regenerate query results using multilingual data sources for various locales, said computer system comprising;

a processor and a memory;

a locale manager configured to provide at least a locale indicator identifying a first language;

a multilingual query engine configured to access multilingual data sources, and configured further to accept query parameters of a query, acquire a condition for filtering said query to provide query results in terms of said condition, and transform said query into a transformed query for application to said multilingual data sources;

a data store for maintaining multilingual objects, at least one of which defines associations among said condition, any of said plurality of locale indicators, and at least a language-independent key;

wherein said transformed query is configured to provide said query results in any language as determined by one of a plurality of locale indicators;

wherein said multilingual query engine is further configured to retrieve said key from said data sources using said locale indicator and said condition;

wherein said multilingual query engine is further configured to form said transformed query by associating said query with said key and a variable capable of having a value equivalent to any of said plurality of locale indicators.

10. The computer system of claim 9 further comprising a report engine configured to generate a report including said query results in a language specified by said one of said plurality of locale indicators.

* * * * *